United States Patent [19]
Tsutsumi et al.

[11] 3,945,665
[45] Mar. 23, 1976

[54] INFLATABLE TYPE OCCUPANT RESTRAINT DEVICE FOR AUTOMOBILE OR THE LIKE

[75] Inventors: Masanobu Tsutsumi; Kiyoshi Hanai, both of, Toyota, Japan

[73] Assignee: Toyota Jidosha Kogyo Kabushiki Kaisha, Toyota, Japan

[22] Filed: Oct. 24, 1973

[21] Appl. No.: 409,083

[30] Foreign Application Priority Data
Apr. 4, 1973   Japan.................................. 48-38590

[52] U.S. Cl.......................... 280/150 AB; 280/87 R
[51] Int. Cl.².......................................... B60R 21/10
[58] Field of Search..................... 280/150 AB, 87 R

[56] References Cited
UNITED STATES PATENTS

| | | | |
|---|---|---|---|
| 3,514,124 | 5/1970 | Richardson................... | 280/150 AB |
| 3,680,884 | 8/1972 | Stephenson .................. | 280/150 AB |
| 3,756,620 | 9/1973 | Radke .......................... | 280/150 AB |
| 3,774,932 | 11/1973 | Schiesterl...................... | 280/150 AB |
| 3,822,894 | 7/1974 | Muller et al................... | 280/150 AB |
| 3,837,669 | 9/1974 | Nagazumi et al............. | 280/150 AB |

FOREIGN PATENTS OR APPLICATIONS
609,624   9/1960   Italy.............................. 280/150 AB

*Primary Examiner*—Kenneth H. Betts
*Attorney, Agent, or Firm*—Stevens, Davis, Miller & Mosher

[57] ABSTRACT

An inflatable type occupant restraint device for an automobile or the like, comprising a gas bag box secured to the central part of a steering wheel, a gas bag folded up within the gas bag box, and a wheel pad sewn on the outside surface of the gas bag. The wheel pad is detachably and fittingly engaged with the gas bag box. The lower part of the gas bag communicates with a gas passage leading to a gas injection unit. In case of the collision of the automobile or the like, the gas bag is inflated without causing the wheel pad to fly off.

5 Claims, 5 Drawing Figures

INFLATABLE TYPE OCCUPANT RESTRAINT DEVICE FOR AUTOMOBILE OR THE LIKE

The present invention relates to an inflatable type occupant restraint device for an automobile or the like in which in order to protect a driver from the secondary collision at the accident of the collision of the automobile with another automobile or with any other object, the cover of a gas bag box provided at the central part of a steering wheel is integrally sewn on the outer surface of a gas bag being received in the gas bag box.

With a prior-art inflatable type occupant restraint device of this sort, when the automobile equipped with the device causes the colliding accident, the gas bag received in the gas bag box disposed at the central part of the steering wheel is instantaneously inflated, and simultaneously with the inflation of the gas bag, the cover of the gas bag box flies off in the inflating out direction. For this reason, there is the danger that the cover sent flying will hit the driver on the head, face or breast and injure it.

An object of the present invention is to provide an inflatable type occupant restraint device in which a wheel pad being the cover is securely fixed to the front or a side of the outer surface portion of a gas bag, and the wheel pad is held fixed to the outer surface portion of the gas bag at the inflating action of the gas bag, whereby the wheel pad is prevented from flying off, to protect a driver more reliably.

These and other objects, features and advantages of this invention will become more apparent upon a reading of the following detailed specification and drawing in which.

Figure 1:
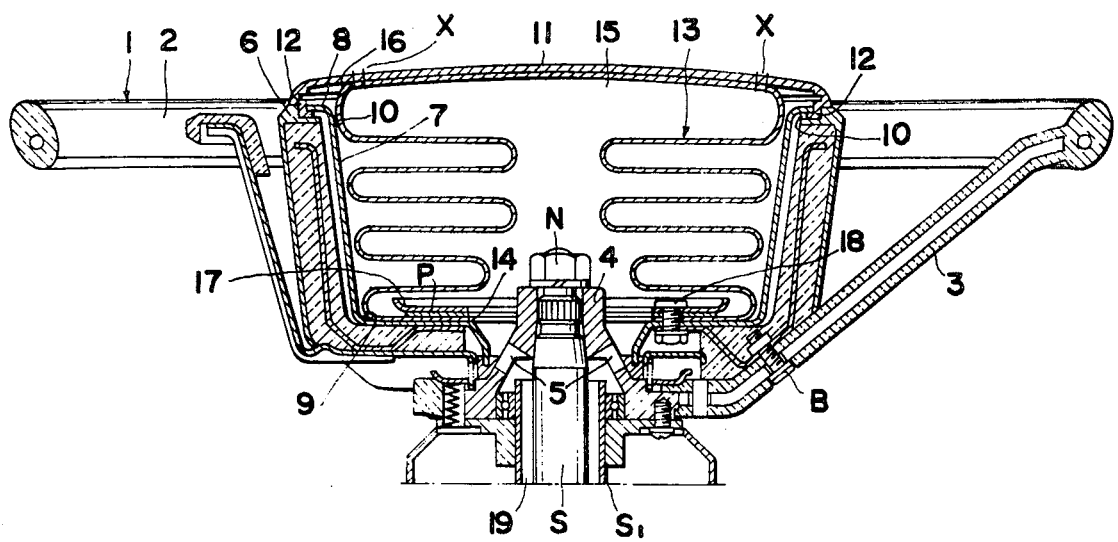
FIG. 1 is a schematic longitudinal section showing the state in which a gas bag and a wheel pad being a cover are integrally coupled and are assembled into a gas bag box disposed in a steering wheel.

In an embodiment illustrated in FIGS. 1 to 4, a steering wheel 1 is composed of a rim 2, spokes 3 integral with the rim 2, and a boss portion 4 integrally coupled with the spokes 3. A gas bag box 6 having an opening part on the seat side is secured to the spokes 3 by bolts (B). Within the gas bag box 6, there is disposed an inner box 7 formed of a soft synthetic resin material.

The inner box 7 is made an opening part on the seat side, and its peripheral edge is formed as a flange part 8 extending outwardly.

Above the inner box 7 and at the seat-side opening part of the gas bag box 6, there is detachably and fittedly mounted a wheel pad 11 which is a cover made of a single plate of a soft synthetic resin material.

The steering wheel 1 is secured onto a steering shaft (S) by a nut (N). The boss portion 4 is provided with a plurality of gas injection ports 5 which communicate with a gas passage 19.

A gas bag 13 formed of a film of a flexible and airtight material, for example, a sheet of cotton or a synthetic resin is received in the inner box 7 in a manner to be folded up by suitable means.

The gas bag 13 has a lower peripheral edge 14, being its lower end part, arranged on the bottom 9 of the inner box 7 with a packing (P) placed thereon. A ring-shaped retainer 17 arranged above the lower peripheral edge 14 and the bottom 9 of the inner box 7 are secured by a plurality of bolts and nuts 18, so that the lower peripheral edge 14 of the gas bag 13 is mounted on the bottom 9 of the inner box 7 in airtight condition.

The interior 15 of the gas bag 13 communicates through the gas injection ports 5 provided in the boss portion 4, with the gas passage 19 formed between a steering column shaft $(S_1)$ and the main shaft (S). The gas passage 19 leads to a gas injection device not shown.

The fitting structure between the wheel pad 11 and the gas bag box 6 is as stated below. At the clearance part between the whole peripheral edge part of the gas bag box 6 on the opening part side and the flange part 8 of the inner box 7, a groove portion 10 substantially L-shaped in cross section is formed. At the whole peripheral edge part of the wheel pad 11, an engaging piece 12 directed towards the center thereof and being substantially L-shaped in cross section is formed into a ring shape. The engaging piece 12 is fitted and disposed into the groove 10 provided above the gas bag box 6.

Figure 2:
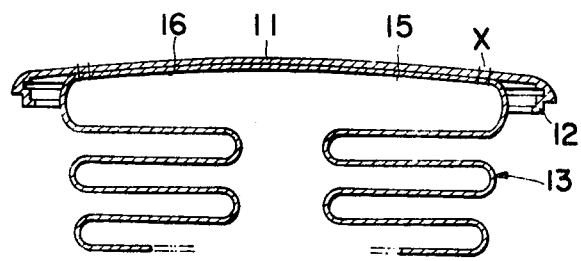
FIGS. 2 and 3 are a longitudinal section and a front view, respectively, showing coupling means between the gas bag and the wheel pad.
Figure 3:
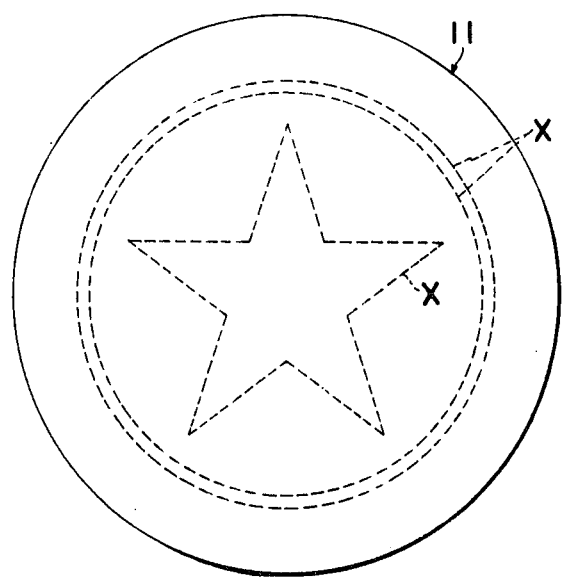

As illustrated in FIGS. 2 and 3, the wheel pad 11 and the gas bag 13 are integrally sewn and fixed by a sewing portion (X) so that the wheel pad 11 may be located at the central upside part of the outer surface part 16 of the gas bag 13 at the inflation action of the gas bag 13. Since the sewing portion (X) is exposed to the surface of the wheel pad 11, a company mark or any other appropriate shape can be designed.

Figure 4:
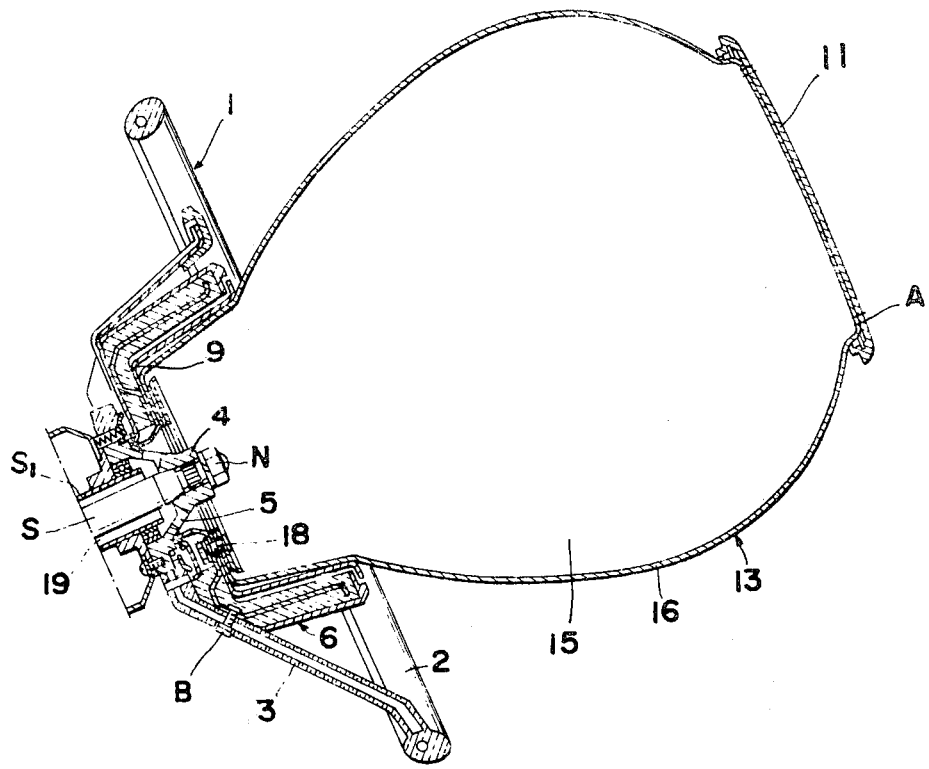
FIG. 4 is a longitudinal section showing the positional relation of the wheel pad at the inflation of the gas bag.

FIG. 4 shows the relation between the wheel pad 11 and the gas bag 13 in the case where when the automobile equipped with the embodiment causes an accident, such as a head-on or rear-end collision with another car and a collision with any other object, in the course of running, the gas injection device is actuated by a command of a collision sensor, and the gas bag 13 is inflated.

A gas fed from the gas injection device simultaneously with the collision passes through the gas passage 19 predetermined, and is supplied from the gas injection ports 5 formed in the boss portion 4 to the interior 15 of the gas bag 13 received in the inner box 7. When a certain amount of the gas is injected and supplied to inflate the gas bag 13, the wheel pad 11 fitted on the gas bag box 6 is easily bent by a pressure at the inflation since it is made of the single plate of the soft synthetic resin material. Then, the fitted engagement between the gas bag box 6 and the wheel pad 11 which have the foregoing fitting structure is released, and the gas bag 13 is inflated on the steering wheel 1 at the same time. At this time, the wheel pad 11 is held as shown in FIG. 4 as it remains secured at the central part of the outer surface part 16 of the gas bag 13. With some difference in time from the completion of the instantaneous inflation of the gas bag 13, the body of the driver hits on the wheel pad 11.

As a result, there is thoroughly eliminated the danger as in the prior-art device that the wheel pad 11 of the gas bag box 6 will be sent flying at the inflation of the gas bag 13 and that the driver will be injured by the wheel pad 11 before being restrained by the gas bag. Since the wheel pad 11 is formed of the soft synthetic resin material, the collision of the body with the wheel pad 11 is not dangerous. In case where the body is hit against the upside of the wheel pad 11, the impact force is absorbed and relieved by the whole gas bag 13, and hence, there is no danger of injury. Further, in case where a projecting artricle such as writing goods and a comb is in a bosom pocket of the driver, the presence of the wheel pad 11 prevents the inflated gas bag 13 from being broken and rendered unusable by the projecting article.

Figure 5:
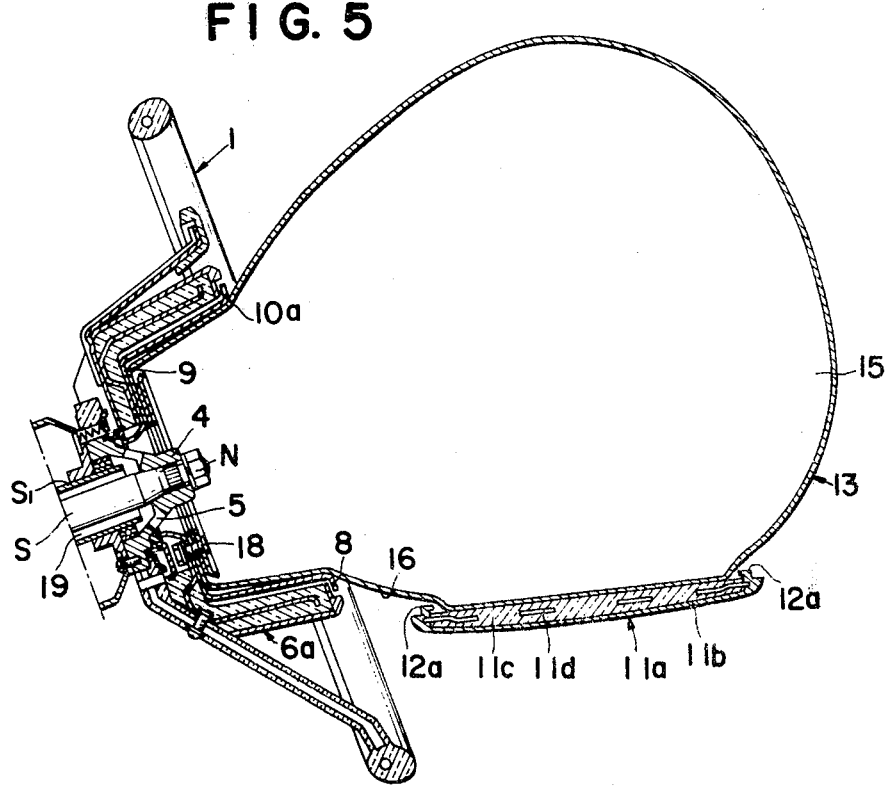
FIG. 5 illustrates another embodiment, and is a longitudinal section showing the positional relation of the wheel pad at the inflation of the gas bag.

FIG. 5 shows another embodiment, in which a wheel pad $11_a$ is mounted so that it may be held at a side part of the gas bag 13 in case of the inflation of the gas bag. Thus, the wheel pad $11_a$ is prevented from directly hitting against the body of the driver in case of the inflation of the gas bag 13.

The wheel pad $11_a$ is composed of a frame $11_b$ formed by a soft synthetic resin material, foamed urethane $11_c$ filled up into a hollow part of the frame $11_b$, and a shape keeping plate $11_d$ being a ring-shaped thin sheet buried in the foamed urethane and made of a synthetic resin.

The engaging structure between the wheel pad $11_a$ and the gas bag box $6_a$ is similar to that in the previous embodiment, and they are detachably fitted by the L-shaped engaging portion 12 formed at the outer peripheral edge of the wheel pad $11_a$ and the groove portion $10_a$ formed above the gas bag box $6_a$.

The other construction and operation are the same as in the previous embodiment.

What we claim is:

1. An inflatable type occupant restraint device for an automobile or the like comprising:
    a gas bag box secured at the central part of a steering wheel and having an opening part on a seat side,
    a gas bag accommmodated in said gas bag box in a manner to be folded up,
    a wheel pad firmly secured onto the outer peripheral surface of said gas bag,
    said wheel pad being detachably fitted to the peripheral edge of the seat-side opening part of said gas bag box by engaging means,
    the lower part of said gas bag communicating with gas injection ports joining to a gas passage, and
    an inner box disposed inside the gas bag box, said inner box comprising a flange which is opened on the seat side and whose peripheral edge part extends outwardly.

2. An inflatable type occupant restraint device for an automobile or the like comprising:
    a gas bag box secured at the central part of a steering wheel and having an opening part on a seat side,
    a gas bag accommodated in said gas bag box in a manner to be folded up,
    a wheel pad firmly secured onto the outer peripheral surface of said gas bag,
    said wheel pad being detachably fitted to the peripheral edge of the seat-side opening part of said gas bag box by engaging means,
    the lower end part of said gas bag communicating with gas injection ports joining to a gas passage,
    said gas bag having its lower peripheral edge arranged on the bottom of an inner box, and
    a ring-shaped retainer arranged on said lower peripheral edge and said bottom of said inner box is secured by a plurality of bolts and nuts so that said gas box is mounted on said bottom of said inner box in airtight condition.

3. An inflatable type occupant restraint device for an automobile or the like comprising:
    a gas bag box secured at the central part of a steering wheel and having an opening part on a seat side,
    a gas bag accommodated in said gas bag box in a manner to be folded up,
    a wheel pad firmly secured onto the outer peripheral surface of said gas bag, said wheel pad being fixed to a side part of said gas bag,
    said wheel pad being detachably fitted to the peripheral edge of the seat-side opening part of said gas bag box by engaging means,
    the lower end part of said gas bag communicating with gas injection ports joining to a gas passage, and
    said wheel pad comprises a frame formed of a soft synthetic resin material, a foamed urethane filled up into a hollow part inside said frame, and a shape keeping plate which is a ring-shaped thin sheet buried in the interior of said foamed urethane and made of a synthetic resin.

4. An inflatable type occupant restraint device for an automobile or the like comprising:
    a gas bag box secured at the central part of a steering wheel and having an opening part on a seat side,
    a gas bag accommodated in said gas box in a manner to be folded up,
    a wheel pad firmly secured onto the outer peripheral surface of said gas bag,
    said wheel pad being detachably fitted to the peripheral edge of the seat-side opening part of said gas bag box by engaging means, said engaging means comprising a groove portion substantially L-shaped in cross section and an engaging piece substantially L-shaped in cross section, said groove portion being at the clearance part between the whole peripheral edge portion of the seat-side opening part of said gas bag box and a flange portion of an inner box, said engaging piece being formed into a ring shape at the peripheral edge part of said wheel pad and towards the center thereof and being fitted into said groove portion, and
    the lower end part of said gas bag communicating with gas injection ports joining to a gas passage.

5. An inflatable type occupant restraint device for an automobile or the like comprising:
    a gas bag box secured at the central part of a steering wheel and having an opening part on a seat side,
    a gas bag accommodated in said gas bag box in a manner to be folded up,
    a wheel pad firmly secured onto the outer peripheral surface of said gas bag,
    said wheel pad being detachably fitted to the peripheral edge of the seat-side opening part of said gas bag box by engaging means,
    the lower end part of said gas bag communicating with gas injection ports joining to a gas passage,
    said gas bag having its lower peripheral edge arranged on the bottom of an inner box, and
    a ring-shaped retainer arranged on said lower peripheral edge and said bottom of said inner box and secured by securing means so that said gas box is mounted on said inner box in airtight condition.

* * * * *